United States Patent [19]

Honiden et al.

[11] 4,385,607
[45] May 31, 1983

[54] AUTOMOBILE IGNITION TIMING CONTROL SYSTEM

[75] Inventors: Yoshinori Honiden; Katsumi Okazaki, both of Hiroshima, Japan

[73] Assignee: Toyo Kogyo Co., Ltd., Hiroshima, Japan

[21] Appl. No.: 260,723

[22] Filed: May 5, 1981

[30] Foreign Application Priority Data

May 20, 1980 [JP] Japan .................................. 55-67239

[51] Int. Cl.³ .............................................. F02P 5/14
[52] U.S. Cl. .................................... 123/425; 123/418
[58] Field of Search ............... 123/425, 435, 415, 418, 123/419, 422, 423

[56] References Cited

U.S. PATENT DOCUMENTS 4,102,311 7/1978 Crall et al. ........................... 123/415

4,211,194 7/1980 Hattori et al. ...................... 123/425

Primary Examiner—Charles J. Myhre
Assistant Examiner—Andrew M. Dolinar
Attorney, Agent, or Firm—Wenderoth, Lind & Ponack

[57] ABSTRACT

An ignition timing control system for an automobile internal combustion engine comprises knocking detecting circuitry, ignition timing control circuitry and inhibiting circuitry. The inhibiting circuitry is operable to interrupt the supply of an output signal from the detecting circuitry to the control circuitry only when the engine, which has been operated under a particular operating condition wherein the engine speed is lower than a predetermined speed value while the actual load imposed on the engine is larger than a predetermined load value, is operated under any one of operating conditions other than such particular operating conditions.

4 Claims, 9 Drawing Figures

AUTOMOBILE IGNITION TIMING CONTROL SYSTEM

BACKGROUND OF THE INVENTION

The present invention generally relates to an ignition timing control system for an automobile internal combustion engine and, more particularly to an ignition timing control system of a type operable to retard the ignition timing for a predetermined time when knocking occurs in the engine.

As is well known to those skilled in the art, the ignition timing at which a spark plug is set to fire is determined in consideration of the engine operating condition so that the automobile engine can work to its optimum efficiency. For this purpose, an ignition timing control system has long been employed to control the ignition timing. However, the prior art ignition timing control system includes detectors for detecting the engine speed (i.e. the number of revolutions of the engine) and the negative pressure inside the engine fuel intake system, respectively, and is so designed that, when the engine speed so detected is high or low, the ignition timing is advanced or retarded, respectively, and also that, when the load imposed on the engine is small or large, the ignition timing is advanced or retarded, respectively, whereby the ignition timing is maintained so as to achieve the MBT (Minimum Advance for Best Torque) value. An example of this prior art ignition timing control system is disclosed in Japanese Patent Laid-open Publication No. 53-129740, laid open to public inspection on Nov. 13, 1978.

However, it has been found that, when the ignition timing is selected attaching importance to the engine torque, the engine tends to knock before the ignition timing attains the MBT, particularly when the engine is operated under low speed, high load conditions. This in turn results in loss of the safe operability of the engine.

In order to obviate the above described problem, the ignition timing control system is additionally provided with a knocking detecting device operable to cause the ignition timing control system to retard the ignition timing for a predetermined period of time in response to an output signal generated from the knocking detecting device when the engine knocks. An example of the prior art ignition timing control system utilizing the knocking detecting system is disclosed in, for example, Japanese Patent Laid-open Publication No. 54-116525, laid open to public inspection on Sept. 10, 1979.

However, the system disclosed in the second mentioned publication is susceptible to a surging phenomenon in which the advance and retard of the ignition timing are repeated in a short period of time before and after the occurrence of the engine knocking.

However, according to, for example, Japanese Patent Laid-open Publication No. 54-153928, laid open to public inspection on Dec. 4, 1979, there is disclosed an ignition timing control system effective to substantially eliminate the surging phenomenon. However, since the ingition timing control system disclosed in this publication is so designed as to retard the ignition timing by the detection of the occurrence of the engine knocking and to maintain the retarded ignition timing for a predetermined period of time subsequent to the occurrence of the engine knocking for the purpose of avoiding the surging phenomenon, the ignition timing tends to remain retarded even when and after the engine which has been operated under the low speed, high load operating condition has subsequently become operated under any operating condition other than the low speed, high load operating condition. Accordingly, with the system disclosed in the last-mentioned publication, there is a possibility that the spark plug is set to fire at an improper ignition timing even though the engine is operated under the operating condition wherein no tendency of engine knocking occurs. This in turn results in not only a loss of engine operating efficiency but also in increased fuel consumption.

SUMMARY OF THE INVENTION

Accordingly, the present invention has been developed with a view to substantially eliminating the disadvantages and inconveniences inherent in the prior art ignition timing control systems and has for its essential object to provide an improved ignition timing control system effective to cause the spark plug to be set to fire at a proper ignition timing, without the retarded ignition timing being maintained, immediately after the engine being operated has shifted from the operating condition in which engine knocking has occurred to any one of the other engine operating conditions.

According to the present invention, the improved ignition timing control system comprises a knock detecting circuit means for generating an output signal only when knocking has occurred in the engine, an ignition timing control circuit means for controlling the ignition timing in dependence on at least one of the engine parameters including the engine speed and the negative pressure inside a fuel intake system of the engine, and an inhibiting circuit means for interrupting the supply of the output signal from the knocking detecting circuit means to the ignition timing control circuit means only when the engine that has been operated under a particular operating condition wherein the engine speed is lower than a predetermined value while the actual load imposed on the engine is larger than a predetermined value, then is operated under any one of the operating conditions other than said particular operating condition.

BRIEF DESCRIPTION OF THE DRAWINGS

These and other objects and features of the present invention will become clear from the following description taken in conjunction with a preferred embodiment thereof with reference to the accompanying drawings, in which.

DETAILED DESCRIPTION OF PREFERRED EMBODIMENT

Figure 1:
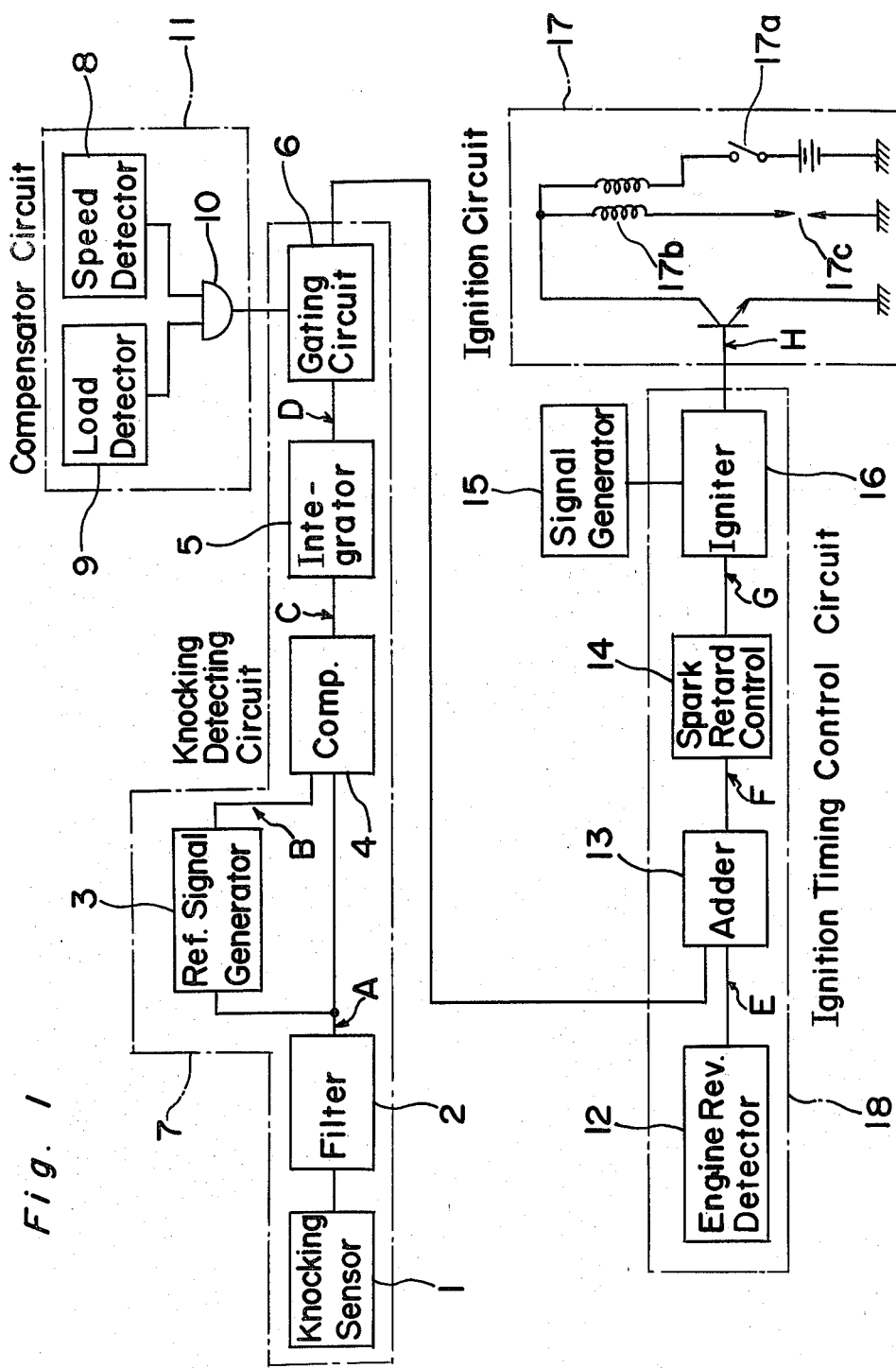
FIG. 1 is a circuit block diagram showing an ignition timing control system embodying the present invention.

Before the description of the present invention proceeds, it is to be noted that like parts are designated by like reference numerals throughout the accompanying drawings.

Referring to FIG. 1, an ignition timing control system embodying the present invention generally comprises a knocking detecting circuit 7, a compensator circuit 11 and an ignition timing control circuit 18. The knocking detecting circuit 7 includes a knocking sensor 1, which may be a piezoelectric sensor, for generating an output signal the voltage of which is a function of the frequency of vibrations of an automobile internal combustion engine sensed thereby, a filter 2 for extracting a predetermined frequency component from the output signal of the knocking sensor 1, the waveform of an output signal of said filter 2 being shown by A in FIG. 2, and a comparator 4 having one input terminal connected directly to the filter 2 and the other input terminal connected through a reference signal generator 3 to the filter 2. The reference signal generator 3 applies a reference signal B of predetermined level to the comparator 4 which serves to compare the output signal from the filter 2 with the reference signal. The comparator 4 generates a difference signal, as shown by C, which is indicative of the difference in level between the reference signal B and the output signal A from the filter 2.

The knocking detecting circuit 7 also includes an integrator 5 for integrating the difference signal C, and a gating circuit 6 operable to pass an output signal from the integrator 5 therethrough only when a gating signal is applied thereto from the compensator circuit 11 as will be described later.

The compensator circuit 11 comprises an engine speed detector 8 so designed as to generate an output signal only when the number of revolutions of the automobile engine exceeds a predetermined value, which may be, for example, 3000 rpm of half the maximum available number of revolutions of the engine, a load detector 9 so designed as to generate an output signal only when the load imposed on the engine is smaller than a predetermined value, for example, half the highest possible load, and an OR gate 10 for supplying either one of the output signals respectively from the detectors 8 and 9. The speed detector 8 may comprises a tachometer and a comparator so designed that, only when the voltage of an output signal from the tachometer indicative of the number of revolutions of the engine, i.e., the engine speed, exceeds a predetermined reference voltage, it can generate an output signal indicative of the excess of the engine speed over the predetermined value. Similarly, the load detector 9 may comprises a load sensor and a comparator so designed that, only when the voltage of an output signal from the load sensor indicative of the actual load imposed on the engine becomes lower than a predetermined reference voltage, it can generate an output signal indicative of the lowering of the load below the predetermined value. It is to be noted that the load sensor forming a part of the load detector 9 may be of a type capable of detecting either the negative pressure developed inside a fuel intake system of the engine, the opening of a carburetor throttle valve, the amount of depression of a foot-operated acceleration pedal, or a supercharged pressure.

Figure 9:
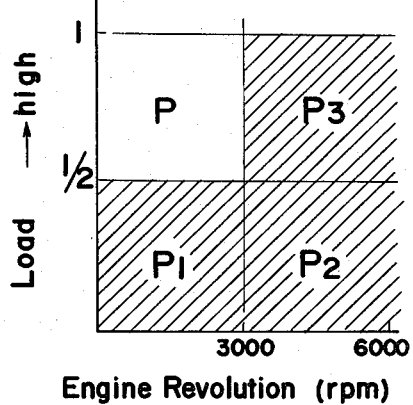
FIG. 9 is a schematic diagram showing various engine operating conditions and is employed for explanatory purposes.

The compensator circuit 11 of the construction described above is so designed as to interrupt the supply of the output signal from the knocking detecting circuit 7 to the ignition timing control circuit 18 only when the automobile engine is operated under operating conditions, shown by regions $P_1$, $P_2$ and $P_3$ in FIG. 9, other than the engine operating condition wherein, as shown by the region P in FIG. 9, the actual load on the engine is larger than the predetermined value while the engine speed is lower than the predetermined value.

The ignition timing control circuit 18 includes a tachometer 12 for detecting the engine speed, or any other suitable detector for detecting a parameter indicative of the engine speed, and for generating an output signal E indicative of the engine speed, an adder 13 for summing the output signal E and the output signal from the knocking detecting circuit 7, and a spark retard control 14 operable in response to an output signal F from the adder 13 for controlling the angle by which the spark advance is desired to be retarded. The ignition timing control circuit 18 also includes an igniter 16 adapted to receive an output signal G from the spark retard control 14 on the one hand and a train of pulses generated from a signal generator 15 in synchronism with the revolution of the engine. This igniter 16 is operable to supply a high-voltage surge H of current to an ignition circuit 17, the timing at which the high-voltage surge of current is supplied to the ignition circuit 17 being, however, controlled by the output signal G from the spark retard control 14, if it is applied to the igniter, so that the ignition timing can be retarded an angle determined by the output signal G.

The ignition circuit 17 and its operation are well known to those skilled in the art and, so far as illustrated, it includes an ignition switch 17a, an ignition coil assembly 17b and a spark plug 17c.

The operation of the ignition timing control system of the construction described above will now be described with particular reference to FIGS. 2 to 9.

Figure 7:
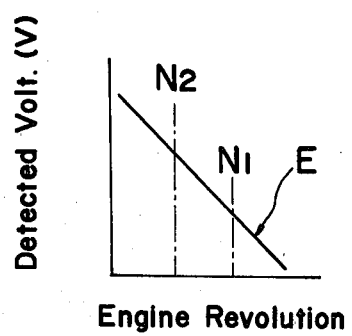
FIG. 7 is a diagram showing a relationship between the engine speed and the voltage of an output signal indicative of the engine speed.
Figure 8:
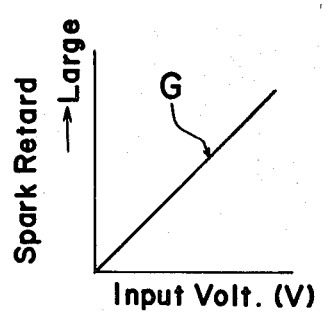
FIG. 8 is a diagram showing a relationship between the voltage of an input signal to a spark retard control circuit and the extent to which the ignition timing is retarded.

Assuming that knocking does not occur in the automobile engine being operated, the engine speed detector 12 generates the output signal E, the voltage of which is proportional to the engine speed as shown in FIG. 7. The voltage representative of the engine speed is supplied through the adder 13 to the spark retard control 14. This spark retard control 14 in turn generates the output signal G, the voltage of which increases with an increase of the voltage supplied thereto as shown in FIG. 8. The higher the voltage supplied to the control 14, the smaller the angle the ignition timing is retarded. In other words, the higher the engine speed is, the smaller the angle the ignition timing is retarded. In this manner, the igniter 16 controls the ignition circuit 17 in dependence on the output signal G from the control 14 in synchronism with the engine revolutions.

Figure 2:
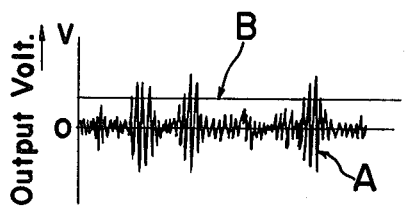
FIGS. 2 to 6 are diagrams showing waveforms of various electrical signals appearing in the circuit block diagram of FIG. 1.
Figure 3:
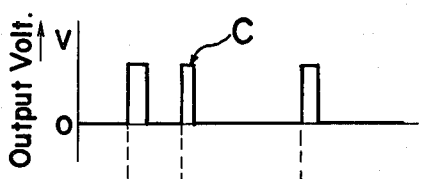
Figure 4:
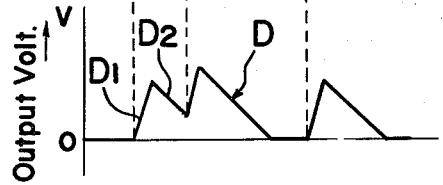
Figure 5:
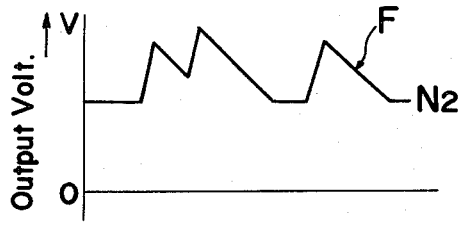
Figure 6:
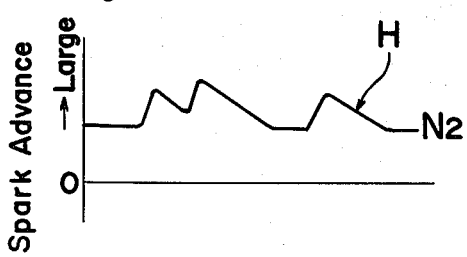

However, once a knocking tendency occurs in the engine being operated, the filter 2 generates the output signal A of the waveform, shown in FIG. 2, based on the output signal from the knocking sensor 1 which is indicative of the frequency of vibrations of the engine. When the level of the output signal A from the filter 2 is higher than the predetermined level determined by the reference signal generator 3, the comparator 4 generates the difference signal C as shown in FIG. 3, the presence of the difference signal being indicative of the occurrence of the engine knocking. The difference signal C from the comparator 4 is integrated by the integrator 5 to give the output signal D of the waveform shown in FIG. 4.

The output signal D from the integrator 5 is then supplied through the gating circuit 6 to the adder 13 which also receives the output signal E from the engine speed detector 12. After the output signals D and E respectively from the integrator 5 and the engine speed detector 12 have been summed up, the adder 13 generates the output signal F of the waveform shown in FIG. 5, the level of voltage of output signal F being variable according to the actual engine speed detected by the detector 12, i.e. high or low respectively when the actual engine speed is high or low. This output signal F is supplied to the spark retard control 14 and, as a result thereof, the igniter 16 applies its output signal H of the waveform shown in FIG. 6 to the ignition circuit 17, the angle by which the ignition timing is retarded being determined by the voltage of the output signal H from the ignition 16.

In the manner described above, when engine knocking occurs, the ignition timing can be retarded by an angle determined in dependence on the engine speed plus an angle determined in dependence on the voltage of the output signal D, thereby to avoid any possible occurrence of the engine knocking.

In the construction and operation so far described, the responsiveness of the knocking prevention system, that is, the time required for the system to retard the ignition timing subsequent to the detection of the knocking tendency, is determined by the angle of inclination of a linear portion D of the waveform of the output signal D. The larger the inclination angle of the portion D, the higher the responsiveness.

On the other hand, the time required for the spark plug to be fired at a normal ignition timing subsequent to the extinguishment of the engine knocking is determined by the angle of inclination of a linear portion $D_2$ of the waveform of the output signal D. However, in order to avoid any possible surging in which the ignition timing is repeatedly advanced and retarded in a short period of time with respect to the time at which the engine knocking has occurred, the inclination angle of the portion $D_2$ is made to be so small that the ignition timing can be retarded for a predetermined time while the timing at which the normal ignition timing is to be resumed is delayed. Accordingly, in view of the small inclination angle of the linear portion $D_2$ of the waveform of the output signal D, the ignition timing will remain considerably retarded even when the engine, which has been knocking when operated under the engine operating condition falling within the region P of the graph of FIG. 9, that is, under the operating condition wherein the actual load on the engine was larger than the predetermined value while the engine speed was lower than the predetermined value, becomes operated under any one of the engine operating conditions falling within the respective regions $P_1$, $P_2$ and $P_3$ of the graph of FIG. 9. This involves problems associated with fuel consumption and engine operating efficiency.

However, the present invention is substantially free from the above described problems because of the utilization of the compensator circuit 11. Specifically, when the engine is operated under any one of the operating conditions falling within the respective regions $P_1$, $P_2$ and $P_3$, the gating circuit 6 is closed by either the output signal from the speed detector 8 indicative of the excess of the engine speed over the predetermined value or the output signal from the load detector 9 indicative of the lowering of the load on the engine below the predetermined value, thereby interrupting the supply of the output signal D to the ignition timing control circuit 18. Thus, in view of the absence of the output signal D to be supplied to the ignition timing control circuit 18 and, more particularly, to the adder 13, the angle by which the ignition timing has been retarded as determined by the output signal G from the spark retard control 14 is cancelled, thereby enabling the spark plug to be fired at a normal ignition timing.

Thus, according to the present invention, when the automobile engine becomes operated under any one of the operating conditions other than the engine operating condition susceptible to engine knocking, that is, the engine operating condition wherein the actual load imposed on the engine is larger than the predetermined value while the engine speed is lower than the predetermined value, the retardation of the ignition timing which has been effected in response to the detection of the occurrence of the engine knocking is interrupted to enable the ignition of the spark plug to be fired at a normal ignition timing. Therefore, the automobile engine can be operated at a relatively high efficiency without an increase in fuel consumption.

Although the present invention has fully been described in connection with the preferred embodiment thereof, it is to be noted that various changes and modifications are apparent to those skilled in the art. By way of example, although the ignition timing control circuit has been described as operable to control the ignition timing in dependence on the engine speed, it is also possible to make the ignition timing to be controlled in dependence on the negative pressure inside the engine fuel intake system or a combination of the engine speed and the negative pressure inside the fuel intake system.

Accordingly, such changes and modifications are to be understood as included within the scope of the present invention unless they depart therefrom.

We claim:

1. An ignition timing control system for an automobile internal combustion engine having at least one spark plug, which comprises, in combination:
   a knocking detecting circuit means for detecting the occurrence of knocking in the engine and for generating an output signal indicative of the occurrence of the engine knocking;
   an ignition timing control circuit means adapted to receive an output from said detecting circuit means and operable to control the ignition timing, at which the spark plug is set to fire, in dependence on at least one engine parameter including the engine speed and the engine load; and
   an inhibiting circuit means for interrupting the supply of the output signal from said detecting circuit means to said control circuit means only when the engine, which has been operated under a particular operating condition wherein the engine speed is lower than a predetermined speed value while the actual load imposed on the engine is larger than a predetermined load value, becomes operated under any engine operating conditions other than said particular operating condition.

2. A system as claimed in claim 1, wherein said inhibiting circuit means comprises a gating circuit connected between said detecting circuit means and said control circuit means, and a load detector for detecting the actual load imposed on the engine and for generating an inhibiting signal only when the actual load is smaller than the predetermined load value, said inhibiting signal being applied to said gating circuit to cause the latter to interrupt the supply of the output signal from said detecting circuit means to said control circuit means.

3. A system as claimed in claim 1, wherein said inhibiting circuit means comprises a gating circuit connected between said detecting circuit means and said control circuit means, and an engine speed detector for detecting the engine speed and for generating an inhibiting signal only when the engine speed detected thereby exceeds the predetermined speed value, said inhibiting signal being applied to said gating circuit to cause the latter to interrupt the supply of the output signal from said detecting circuit means to said control circuit means.

4. A system as claimed in claim 2, further comprising an engine speed detector for detecting the engine speed and generating an output signal only when the engine speed detected thereby exceeds the predetermined speed value, and an OR gating element for supplying either one of said inhibiting signal or said output signal from said engine speed detector to said gating circuit when said either one of said inhibiting signal or said output signal from said engine speed detector is applied to said OR gating element, thereby interrupting the supply of the output signal from said detecting circuit means to said control circuit means.

* * * * *